(12) United States Patent
Haberl et al.

(10) Patent No.: US 7,853,413 B2
(45) Date of Patent: Dec. 14, 2010

(54) METHOD FOR DETERMINING CHARACTERISTIC VALUES OF A SUSPENDED DRIVEN AXIS, ESPECIALLY OF A MACHINE TOOL, AS WELL AS SUITABLE APPLICATIONS, CORRESPONDING FACILITIES AND THEIR USE

(75) Inventors: Christian Haberl, Renningen (DE); Ewald Lehmann, Oberreichenbach (DE); Joachim Ullrich, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 144 days.

(21) Appl. No.: 12/287,195

(22) Filed: Oct. 7, 2008

(65) Prior Publication Data

US 2009/0112488 A1 Apr. 30, 2009

(30) Foreign Application Priority Data

Oct. 8, 2007 (EP) .................................. 07019662

(51) Int. Cl.
*G01L 3/00* (2006.01)
*F16H 59/00* (2006.01)
(52) U.S. Cl. .......................................... 702/41; 74/337
(58) Field of Classification Search .................. 702/41, 702/85; 74/64, 337; 192/84.6; 73/862.12
See application file for complete search history.

(56) References Cited

U.S. PATENT DOCUMENTS 4,742,722 A * 5/1988 Wallace .......................... 74/64
5,003,829 A * 4/1991 DeConti et al. ........... 73/862.12
6,712,189 B2 * 3/2004 Hirt ........................... 192/84.6

FOREIGN PATENT DOCUMENTS

| EP | 0 548 505 A1 | 6/1993 |
| EP | 0 997 801 A2 | 5/2000 |
| WO | WO 2007/020181 A1 | 2/2007 |
| WO | WO 2007/028850 A1 | 3/2007 |

\* cited by examiner

*Primary Examiner*—Bryan Bui

(57) ABSTRACT

A method for determining at least one characteristic value, especially of a suspended driven axis of a machine, is provided, the axis being driven by a rotating drive unit and/or by a linear drive unit. A torque or a force corresponding to the torque acting on the drive unit is measured along a predetermined movement path of the axis. The torque or the force is measured in the forward direction and reverse direction. Energy-conserving moments or energy-conserving forces on the one hand and/or friction-dependent moments or friction-dependent forces on the other hand are determined by computational overlaying of associated torque or force values as the at least one direction-independent characteristic value.

19 Claims, 5 Drawing Sheets

METHOD FOR DETERMINING CHARACTERISTIC VALUES OF A SUSPENDED DRIVEN AXIS, ESPECIALLY OF A MACHINE TOOL, AS WELL AS SUITABLE APPLICATIONS, CORRESPONDING FACILITIES AND THEIR USE

CROSS REFERENCE TO RELATED APPLICATIONS

This application claims priority of European Patent Office application No. 07019662 EP filed Oct. 8, 2007, which is incorporated by reference herein in its entirety.

FIELD OF INVENTION

The invention relates to a method for determining at least one characteristic value, especially of a suspended driven axis of a machine.

The invention further relates to suitable applications of the method. It also relates to a suitable measurement and evaluation unit for determining at least one such characteristic value, as well as to a suitable use of such a measurement and evaluation unit. Finally the invention relates to a control device for controlling and monitoring a machine as well as to a machine, especially a machine tool, with such a control device.

BACKGROUND OF INVENTION

The axis can be driven by means of a rotating drive unit and/or by means of a linear drive unit. A torque acting on the drive unit or a force corresponding to said torque is measured along a predetermined movement path of the axis.

Methods are generally known from the prior art for monitoring the function of a machine, such as a machine tool for example. The monitoring is typically undertaken on the basis of operating parameters determined or suitable characteristic values. With machines featuring one or more axes characteristic values for describing the movements of the axes are especially known. The characteristic values are for example a minimum, a maximum or an mean torque. These rotational characteristic values are advantageous if the respective machine axis is driven by a rotating drive unit. Such a drive unit mostly features a (rotating) electric motor, which moves the corresponding axis of the machine in a linear manner via a spindle drive. The drive unit can additionally include a converter which then feeds the electric motor. Typically the rotational characteristic values are determined in a synchronization test. This is done by measuring the torque acting on the drive unit torque at a predetermined constant speed of movement. The characteristic values determined in this way can then be monitored to check whether they are exceeding or falling below a comparison or limit value.

In the case of a horizontally arranged axis, the torque measured in the synchronization test then corresponds to a friction moment which must be exerted by the drive unit to compensate for the friction of the axis. If for example a measured mean torque, which in the present case corresponds to an mean frictional moment, exceeds a comparison value, this can indicate increased friction and consequently wear or a lack of lubrication of axis components. An appropriate automated warning message can then be output to a service engineer.

If the drive unit of the axis is a linear drive with a linear motor, then the electrical energy fed into the linear motor direct can be converted directly into a linear movement of the axis. In this case translational characteristic values are more advantageous to describe the axis movement. Such characteristic values are—like the rotational typical characteristic values—a minimum, a maximum or a mean force.

In the case of a horizontally arranged axis the direction in which the axis torque or the axis force is measured, i.e. in the forward direction or the reverse direction, is basically of no significance, since no energy-conserving forces or moments act via the axis on the drive unit. However directional interference variables, such as sticking points in the guide track of the axis can make a separate directionally-dependent determination of the characteristic values and thus a separate monitoring necessary.

If on the other hand the respective axis is not aligned horizontally, for example vertically or sloping at an angle, the weight force acts as a path-independent force in only one direction. Such axes are also referred to as "suspended" axes. This force is thus higher to move the axis in the one direction and lower in the opposite direction. In other words a higher torque is required if the axis is to be moved to a higher energetic level. If the reverse applies the required torque is smaller. It can also be negative depending on the incline of the axis. In this case the drive slows the axis down.

The respective axis can also be moved by means of two or more drives, with the controlled drives being coupled together. In such cases reference is made to coupled drives. The situation can occur here in which one or more drives partly work "against each other", if for example the zero or the reference points in the measurement systems of the drives are different from one another. In such cases the drives can operate against each other over the entire movement path or only partially as well as with positionally-dependent different forces. For example two drives can be present which drive the axis in the same direction of movement. If the second drive in the comparison exhibits a slightly lower moment or a slightly lower force by comparison with the first drive, the second drive has a braking or driving effect on the first drive. It now "appears" for the overall drive as if a path-independent weight force were acting in the sense of a suspended axis, and were doing so independently of the position of the axis, meaning horizontal, sloping or vertical. The remarks below thus also include such effects as act at least partially like a weight force on the axis.

The disadvantage to this is that a directional detection and monitoring of the torques or the axis forces is now necessary. As a result, common limit values are not able to be used for both directions. The disadvantage is also that the overlaying effect of the weight force means especially that a monitoring of comparatively small amounts of friction-dependent characteristic values is not possible at all or is comparatively imprecise.

Suspended axes are also known from the prior art with elastic weight compensation based on an elastic force. The elastic force can for example be created hydraulically, pneumatically or by means of spring force. However this weight compensation cannot compensate for the effect of the weight force over the entire movement path. As a result, an elastic disruptive force appears in parts of the movement path, which presents itself in such a way that the torque or the force needed increases in a linear fashion with the path, while it decreases in the opposite direction in a linear manner.

The elastic weight compensation makes it possible to compensate to some extent for the mean torque values or force values for both directions of movement. However the minimum and maximum values are determined by the size of the elastic force not usually running in a linear manner over the path. These characteristic values can disadvantageously not be included for monitoring the ease of movement and the wear of the respective axis of the machine. At the same time a monitoring especially of disruptive forces occurring during operation is barely possible.

SUMMARY OF INVENTION

An object of the invention is to specify a method which remedies the problems previously mentioned.

A further object of the invention is to specify a measurement and evaluation unit corresponding to the method, a control device with such a measurement and evaluation unit as well as a machine with such a control device.

The object of the invention is achieved with the features of an independent claim. Advantageous method variants are specified in dependent claims. Suitable applications of the method are also given. A further independent claim specifies a measurement and evaluation unit for determining at least one characteristic value of at least one especially suspended driven axis of a machine, especially a machine tool. Dependent claims specify advantageous embodiments of the measurement and evaluation unit. A suitable use of such a measurement and evaluation unit is also given. There is also described a control device for controlling and monitoring a machine which features such a measurement and evaluation unit and a machine, especially a machine tool which features such a control device. Advantageous embodiments of the machine are specified.

The torque or the force is measured in a forward or a reverse direction. Energy-conserving moments or energy-conserving forces on the one hand and/or friction-dependent moments or friction-dependent forces on the other hand are determined by computational overlaying of associated torque or force values as the at least one direction-independent characteristic value.

The division of the detected torques or forces into lossy and in energy-storing characteristic values advantageously enables a more precise monitoring facility. In particular a more precise monitoring of machine components is possible, which are predominantly susceptible to friction or energy-storing by their nature. A further advantage is the anisotropy of the new characteristic values. A directional monitoring with different comparison or limit values in each case is consequently no longer necessary. In addition the inventive division allows a more precise monitoring of the friction-dependent characteristic values which are typically smaller in amount.

An energy-conserving moment is for example that moment which compensates for a weight force acting via the axis on the drive unit. In a corresponding manner an energy-conserving force is that force which compensates for the weight force acting on the linear drive unit. In such cases the directional effect on the drive unit is all the greater the steeper is the incline of the axis.

In particular the energy-conserving moment is that moment which also compensates for an elastic force acting via the axis on the drive unit. In a corresponding manner an energy-conserving force is that force which additionally compensates for a correspondingly acting elastic force. The elastic moment or the elastic force can for example originate from a pneumatic buffer which compresses or decompresses, depending on the movement path of the axis.

According to one embodiment the torque or the force is measured at a predetermined constant speed of movement in the forward and reverse direction. This prevents forces of inertia and speed-dependent friction forces influencing the measurement within the measuring system. The measurement is preferably undertaken during commissioning or during setting or during calibration of the machine.

As an alternative or in addition the respective speed of movement in the forward or reverse direction associated with the torque can be measured. The energy-conserving moments and/or the friction-dependent moments can be determined by computational overlaying of the torque values taking into consideration in the computation associated acceleration-dependent inertial forces and speed-dependent frictional forces. The corresponding energy-conserving and/or friction-dependent forces can be determined in a similar manner.

These method variants, compared to previous method variants, require a greater measurement and computing technology outlay. However these advantageously allow the determination of the new direction-independent characteristic values during operation of the machine. This variant of the method makes possible so to speak a normalization of the new characteristic values with the aid of corresponding speed-dependent and direction-dependent weighting of the detected torque or force values.

According to a further embodiment the torque or force values are measured as a function of the movement path of the axis. The path can be detected by means of a separate movement recorder in the area of the movement path. It can for example alternately be determined via a rotation sensor fitted to the electric motor.

According to an advantageous embodiment the at least one computationally-determined characteristic value is compared to a respective comparison value. In the event of an impermissible deviation from the comparison value a warning message is output. The comparison value can for example be an upper and/or lower limit value. For example the computationally-determined moment of friction can be compared to an upper limit value which indicates too high a level of wear on the axis of the machine.

In particular a computationally-determined, energy-conserving and direction-independent characteristic value is a moment offset, a maximum conserving moment, a minimum conserving moment or a moment trend of the elastic force. In a similar translational respect this characteristic value is a force offset, a maximum conserving force, a minimum conserving force or a force trend of the elastic force.

The moment or force offset is formed by the mean value of all torque or force values being formed respectively for the forward direction as well as for the reverse direction of the axis and over the entire movement path of the axis, preferably at a constant speed. The moment or force offset is formed from the average of the mean force in the forward and reverse direction, meaning upwards and downwards. It describes the mean torque or the mean force which is or are needed to compensate for a constant external force such as the weight force for example.

The maximum conserving moment is formed, for each position of the movement path, by half of the mean value of the torque being calculated in the forward and reverse direction and the absolute maximum being formed from this. The maximum conserving moment describes the torque, which compensates for the maximum energy-conserving torque. In a corresponding manner the maximum conserving force is determined on the basis of corresponding force values.

The minimum conserving moment is formed, for each position of the movement path, by half of the mean value of the torque in the forward and reverse direction being calculated and by the absolute minimum being formed from this. The minimum conserving moment describes the torque which compensates for the minimum energy-conserving torque. The minimum conserving force is determined based on corresponding force values in the same way.

In cases in which the torque or the force changes in an approximately linear manner with the movement, a division of the conventional linear trend into a friction value-dependent trend and an "elastic" energy-conserving trend is advantageous. The linear trend is generally a linear interpolation through the torque curve in the respective direction and a rise in the mathematical sense.

The torque trend of the elastic force is formed by, for each position of the movement path, half of the mean value from the linear trend in the forward direction and the linear trend in reverse direction being determined. This new characteristic value is direction-independent, but, depending on the elastic behavior of the elastic weight compensation, can have different values at different positions of the movement path. The force trend of the elastic force is determined on the basis of corresponding force values in a corresponding manner.

Furthermore a computationally determined friction-dependent and direction-independent characteristic value, especially a mean frictional torque, is a maximum frictional torque, a minimum frictional torque or a trend of the frictional torque. In an analog translational respect this characteristic value is a mean frictional force, a maximum frictional force, a minimum frictional force or a trend of the frictional force.

The mean frictional torque is formed from half of the difference of the mean value of the torque in the forward direction and the mean value of the torque in the reverse direction. It describes the moment which is required to overcome the friction. The mean frictional force is determined in a corresponding manner on the basis of corresponding force values.

The maximum frictional moment is determined by, for each position of the movement path, half of the maximum of the difference between the torque in the forward and reverse direction being formed. It describes the torque required to compensate for the maximum frictional force of the axis. The maximum frictional force is determined on the basis of corresponding force values in a corresponding way.

The minimum frictional torque is determined by, for each position of the movement path, half of the minimum of the difference of the torque in the forward and reverse direction being formed. It describes the torque required to compensate for the minimum frictional force of the axis. The minimum frictional force is determined in a corresponding manner on the basis of corresponding force values.

The torque trend of the frictional force is formed, for each position of the movement path, by half the difference from the linear trend in the forward and reverse direction being determined. This new characteristic value is direction-independent and is advantageous in cases in which the frictional force changes in an approximately linear manner with the movement path e.g. because of bad adjustments of the guides of the axis. In a corresponding manner the force trend is determined on the basis of the corresponding force values.

Finally the at least one characteristic value for a number of driven axes of the machine can be determined, such as with machine tools for example, which usually feature a plurality of axes.

In a corresponding manner further characteristic values not described in greater detail can be divided up from the torque curves or axis force curves recorded for the two movement directions into a component based on frictional forces and a component based on energy-conserving forces. In addition the characteristic values can have different weightings.

The specified calculation methods were based on the assumption that for a movement in a positive direction a positive torque and for a movement in a negative direction a negative torque is measured. The forwards direction was assumed for the positive direction and the reverse direction for the negative direction. For a different assignment the relevant characteristic values are to be modified accordingly.

The inventive method for monitoring the at least one characteristic value of the at least one driven axis of the machine is especially applicable during commissioning and/or when making settings and/or during operation of the machine. As an alternative or in addition it can be used to advantage in automation or manufacturing technology.

The object of the invention is further achieved by a measurement and evaluation unit for determining at least one characteristic value of at least one especially suspended driven axis of a machine. The respective axis of the machine is able to be driven by means of a rotating drive unit and/or by means of a linear drive unit. The measurement and evaluation unit is able to be connected for signaling and data processing to a rotational torque sensor or to a force sensor for torque or force measurement of the respective axis and to a linear encoder for recording the movement of the movement path of the respective axis. The measurement and evaluation unit has means for recording torque or force measurements of the respective axis in the forward and reverse direction. It further features means for determining by computation energy-conserving torques or forces on the one side and/or friction-dependent torques or forces on the other hand as the at least one direction-independent characteristic value by computational overlaying of the associated torque or force values.

The measurement and evaluation unit can be a PC or a computer for example which is connected within the framework of commissioning or setting work. It can also be connected via a data network, such as the Internet for example, to a control unit of the machine. The torque or force values, typically transmitted in the form of data to the measurement and evaluation unit can then be evaluated by the measurement and evaluation unit.

According to one embodiment the measurement and evaluation unit has means for detecting the torque or force values depending on the movement path of the respective axis. To do this the measurement and evaluation unit can have a suitable signal input for detection of linear encoder or rotation encoder signals of the machine. Typically the position-dependent torque or force values are already present in the control unit of the machine, so that these can be read out or requested over electronic paths.

In accordance with a further embodiment the measurement and evaluation unit has means for computing the speed of movement of the respective axis in the forward and reverse direction. It further features means for determining the energy conserving moments and/or the friction-dependent moments by computational overlaying of the detected torque taking into account in the computation the associated acceleration-dependent inertial forces and speed-dependent frictional forces. As an alternative or in addition the measurement and evaluation unit can have means for determining corresponding energy-conserving and/or friction-dependent forces by overlaying corresponding force values.

The particular advantage is that a the new characteristic values can be determined during operation of the machine. An interruption to operation which would otherwise be needed is not necessary. Corresponding mathematical models of the machine can be stored in the measurement and evaluation unit for this purpose which describe the kinematic behavior of the machine.

According to a further embodiment the measurement and evaluation unit can have output means for output of the at least one computationally-determined characteristic value. The new characteristic values can for example be presented for display on a display of the measurement and evaluation unit.

In particular the measurement and evaluation unit has comparison means for computational comparison of the at least one characteristic value determined with a respective comparison value and further output means for output of a respective warning message in the event of an impermissible deviation from the comparison value. This enables an automated alert, such as an SMS or a message text, to be sent to a service engineer.

The said means of the measurement and evaluation unit are preferably signal processors or microcontrollers, on which corresponding suitable software programs are executed. Mapped in the software programs are the previously described mathematical computing rules such a mean value creation, difference creation, maximum and minimum creation.

In a similar way to the method, the computationally determinable, energy-conserving and directionally-independent characteristic value is preferably a moment offset, a minimum conserving moment, a maximum conserving moment or a moment trend of the elastic force or a force offset, a maximum conserving force, a minimum conserving force or a force trend of the elastic force. The determinable friction-dependent and direction-independent characteristic value is preferably a mean frictional moment, a maximum frictional moment, a minimum frictional moment or a moment trend of the frictional force or a mean frictional force, a maximum frictional force, a minimum frictional force or a force trend of the frictional force.

The inventive measurement and evaluation unit is preferably able to be used for monitoring the at least one characteristic value of the respective especially suspended driven axis of the machine, especially a machine tool, during commissioning and/or during setting and/or during operation of the machine.

Furthermore the object of the invention is achieved by a control device for control and monitoring of a machine. The machine is especially a machine tool featuring at least one rotating drive unit able to be controlled via the control device and/or a linear drive unit for linear movement of at least one especially suspended axis of the machine. Furthermore the machine features a torque sensor or a force sensor for measuring the torque or force of the respective axis as well as a linear encoder for detecting movement of the movement path of the respective axis. The inventive control device connected or connectable for signaling and/or data processing to the machine features such a measurement and evaluation unit in such cases.

The control device is especially a so-called CNC (Computerized Numerical Control), which typically features a control unit for controlling the movement path of the axis and a control unit for logic control, a so-called PLC (Programmable Logic Controller). Preferably the measurement and evaluation unit or its functionality is integrated into the control device. Since typically the control device is connected for signaling and/or data processing to all sensors of the machine, in principle the torque or force values to be processed by the measurement and evaluation unit as well as the respective current movement position of the axes are already available in the control device. Ideally the measurement and evaluation unit is a software routine held in the program memory of the control unit, especially in the program memory of the path controller for the axes.

The object of the invention is also achieved by a machine, especially by a machine tool which features such a control device and at least one rotating drive able to be controlled via the control device and/or one linear drive unit for linear movement of a respective suspended axis of the machine.

Typically the at least one rotating drive unit features a converter, an electric motor and a spindle drive for converting the rotational movement of the electric motor into a linear travel movement of the respective axis. The converter of the respective drive unit has a current sensor for detecting a motor current. The control device has means for computing the current torque acting on the electric motor from a current value detected by the current sensor.

It is known that there is an essentially linear relationship between the torque-generating motor current and the corresponding torque. This linear relationship is usually described by the so-called torque constant. In other words the torque values necessary for determining the new characteristic values of the axes are able to be derived directly from the current values already detected.

As an alternative or in addition to the previous embodiment the at least one linear drive unit has a converter and a linear motor respectively to move the respective axis. The converter of the respective drive unit features a current sensor for detecting a linear motor current. The control device has means for computing the force currently acting on the linear motor from a current value detected by means of the current sensor.

The force values required for calculating the new characteristic values are able to be derived in a corresponding manner from the already detected motor current values of the linear motor. In this case the proportionality factor between motor current and axis force is the so-called force factor.

BRIEF DESCRIPTION OF THE DRAWINGS

The invention as well as advantageous embodiments of the invention will be described in greater detail below on the basis of the subsequent figures. The figures show FIG. 1 a flow diagram to illustrate the inventive method, FIG. 2 computing rules for determining new, typical rotational characteristic values, FIG. 3 an example of the torque curve of a suspended axis with elastic weight compensation for both directions of the axis and with conventional characteristic values entered, FIG. 4 an example of the characteristic curve in accordance with FIG. 3 with new, direction-independent characteristic values and FIG. 5 an example of an inventive machine tool with suspended axis with elastic, pneumatic weight compensation.

DETAILED DESCRIPTION OF INVENTION

Figure 1:
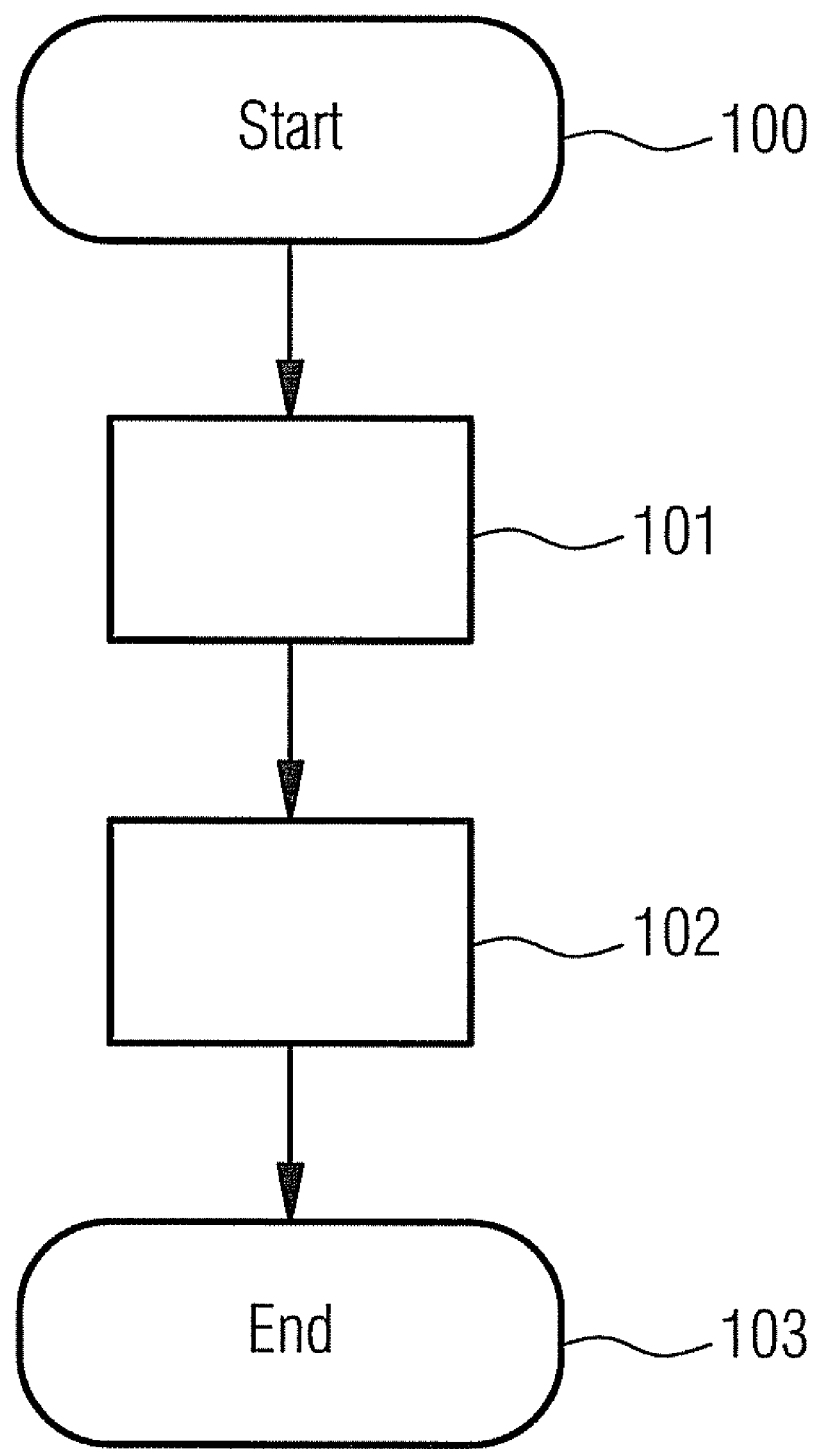

FIG. 1 shows a flow diagram to illustrate the inventive method.

Method step 100 labeled "Start" includes the already known method features for determining at least one characteristic value K1-K8, especially of a suspended driven axis 5 of a machine 1. In the method step 101 the torque MF, MR or the force is inventively measured in the forward and reverse direction. In method step 102 inventive energy conserving torques K2-K4, K8 or energy-conserving forces on the one hand and/or friction-dependent torques K1, K5-K7 or friction-dependent forces on the other hand are then determined by computational overlaying of associated torque or force values as the at least one direction-independent characteristic value K1-K8. The reference symbol 103 identifies the end of the inventive method.

Figure 2:
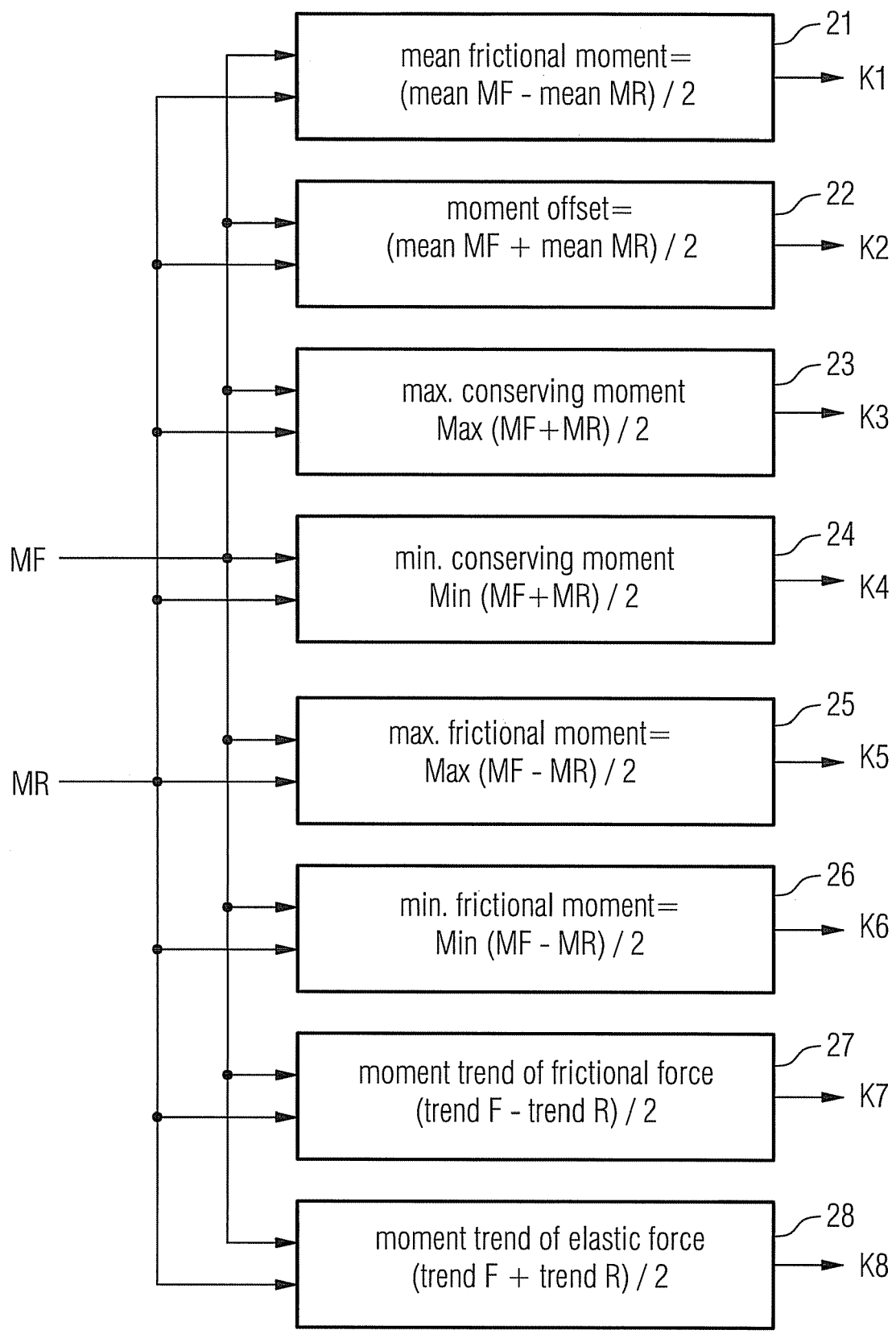

FIG. 2 shows the respective computation rules 21-28 for determining new, typical rotational characteristic values K1-K8.

MF identifies the torque or the associated torque values in a forward direction. MR identifies the torque or the associated torque values in a reverse direction. The torque values MF, MR are included in the calculation of all new characteristic values K1-K8.

The eight typical calculation rules 21-28 determine, in the diagram from top to bottom, a mean frictional moment K1, a moment offset K2, a maximum-conserving moment K3, a minimum conserving moment 4, a maximum frictional moment K5, a minimum frictional moment K6, a moment trend of the frictional force K7 as well as a moment trend of the elastic force K8. Above and beyond this further computation rules are conceivable, which describe a separation of the measured torque values in a friction value-dependent and an energy-conserving proportion. To this end the further computation rules can include suitable normalizations to a predetermined torque value, arithmetic or geometrical weightings and such like.

The computation rules 21-28 shown in FIG. 2 are able to be transferred in a similar manner to translational axis force values for determining corresponding translational characteristic values K1-K8.

In particular the characteristic values K2-K4, K8 are energy-conserving torques which compensate for a weight force operating via the axis on the drive unit. They can also at least partly compensate for an elastic force acting on the drive unit. The elastic force can for example stem from a pneumatic or hydraulic compensation element.

The torque values MF, MR are preferably measured for a predetermined constant speed of movement in the forward and reverse direction. Alternatively for determining the new characteristic values K1-K8 the respective speed of movement associated with the torque values MF, MR in the forward and reverse direction respectively can be measured. The new characteristic values K1-K8 can then be determined in the sense of a normalization by computational overlaying of the torque values MF, MR taking account in the computations of associated acceleration-dependent inertial forces and speed-dependent frictional forces. Preferably the torque values MF, MR are then measured depending on a movement path of the axis.

Subsequently the computationally determined characteristic values K1-K8 can be compared to a respective comparison value, so that a corresponding warning message can be output in the event of an impermissible deviation from the comparison value, to a service engineer for example.

The inventive method is generally suited to determining the characteristic values K1-K8 for a number of driven axes of the machine. It can especially be employed for monitoring the characteristic values K1-K8 of the respective driven axis during commissioning and/or during setting and/or during the course of operation of the machine. In addition or as an alternative, the inventive method can be employed in automation and manufacturing technologies.

Figure 3:
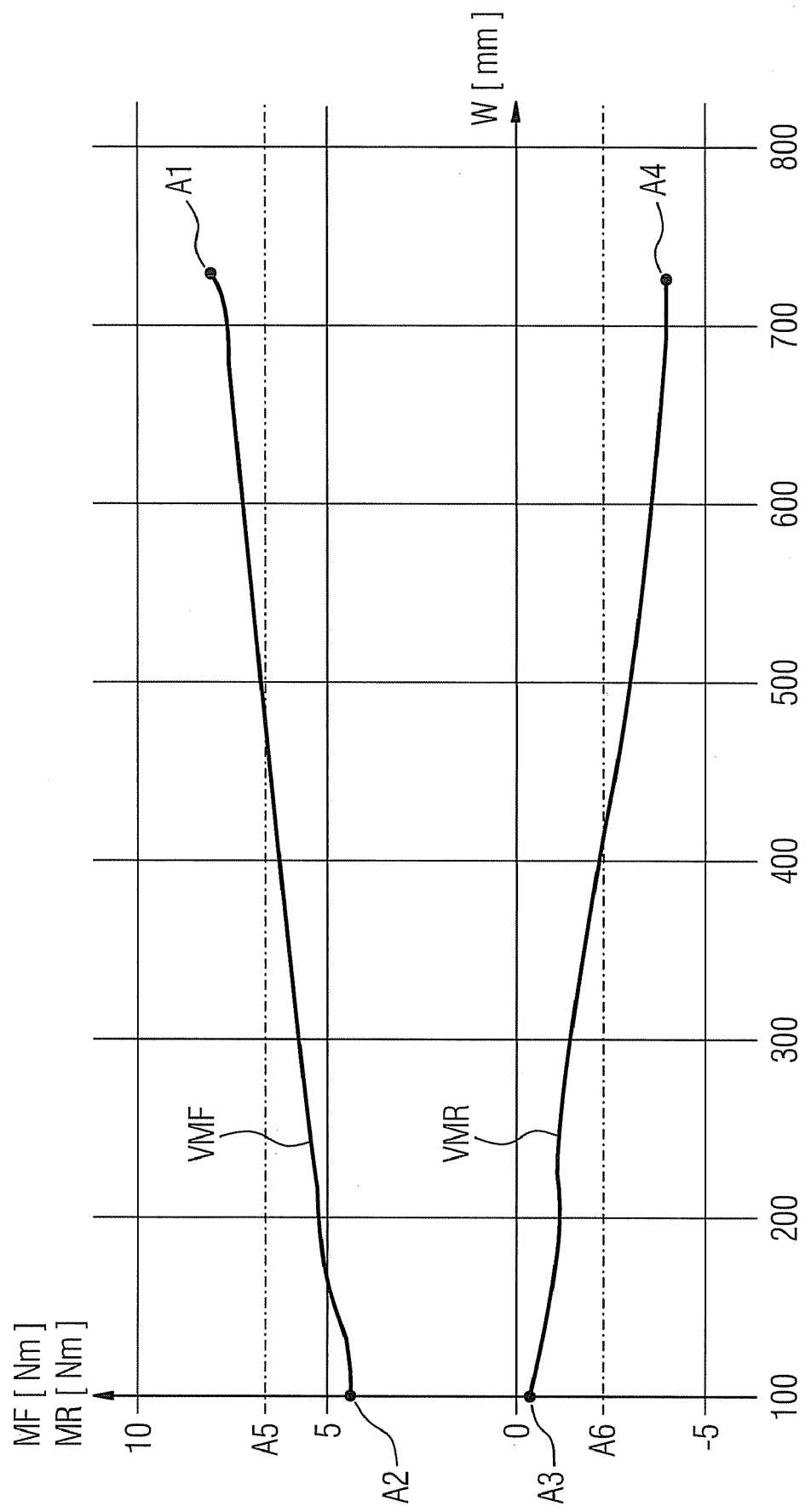

FIG. 3 shows a typical torque curve VMF, VMR of a suspended axis with elastic weigh compensation for both directions of the axis and with the entries for conventional directional characteristic values A1-A6. VMF identifies the characteristic curve in the forward direction and VMR the characteristic curve in the reverse direction. Plotted above the respective position of the movement path W of the axis in millimeters [4 mm] is the corresponding torque MF, MR in Newton meters [Nm]. The reference symbol A1 identifies a maximum torque in the forward direction, A2 a minimum torque in the forward direction with A3 a maximum torque in the reverse direction, A4 a minimum torque in the reverse direction, A5 a mean torque in the forward direction and A6 a mean torque in the reverse direction. The two last values A5, A6 are shown as dashed lines.

As FIG. 3 shows, a far higher torque MF is needed for movement of the suspended axis in the forward direction than in the reverse direction. The typical torque curves VMF, VMR rising or falling in a somewhat linear manner also show that no complete compensation is present for the weight force acting on the suspended axis. In particular marked disruptive forces in the form of non-linearities can be seen in the end section of the movement path, which are caused by the typically nonlinear behavior of the elastic elements.

In the example of FIG. 3 the maximum or minimum torque values MF, MR lie at the start and at the end of the range of movement, meaning approximately in the movement path position 100 mm and 730 mm. On the other hand they can also lie between these two end positions. As FIG. 3 shows, monitoring e.g. of the maximum torque values A1, A3 for overshoots must disadvantageously depend on the respective direction of movement of the axis. In the forward direction the maximum torque A1 is to be monitored and in the reverse direction the maximum torque A3.

Figure 4:
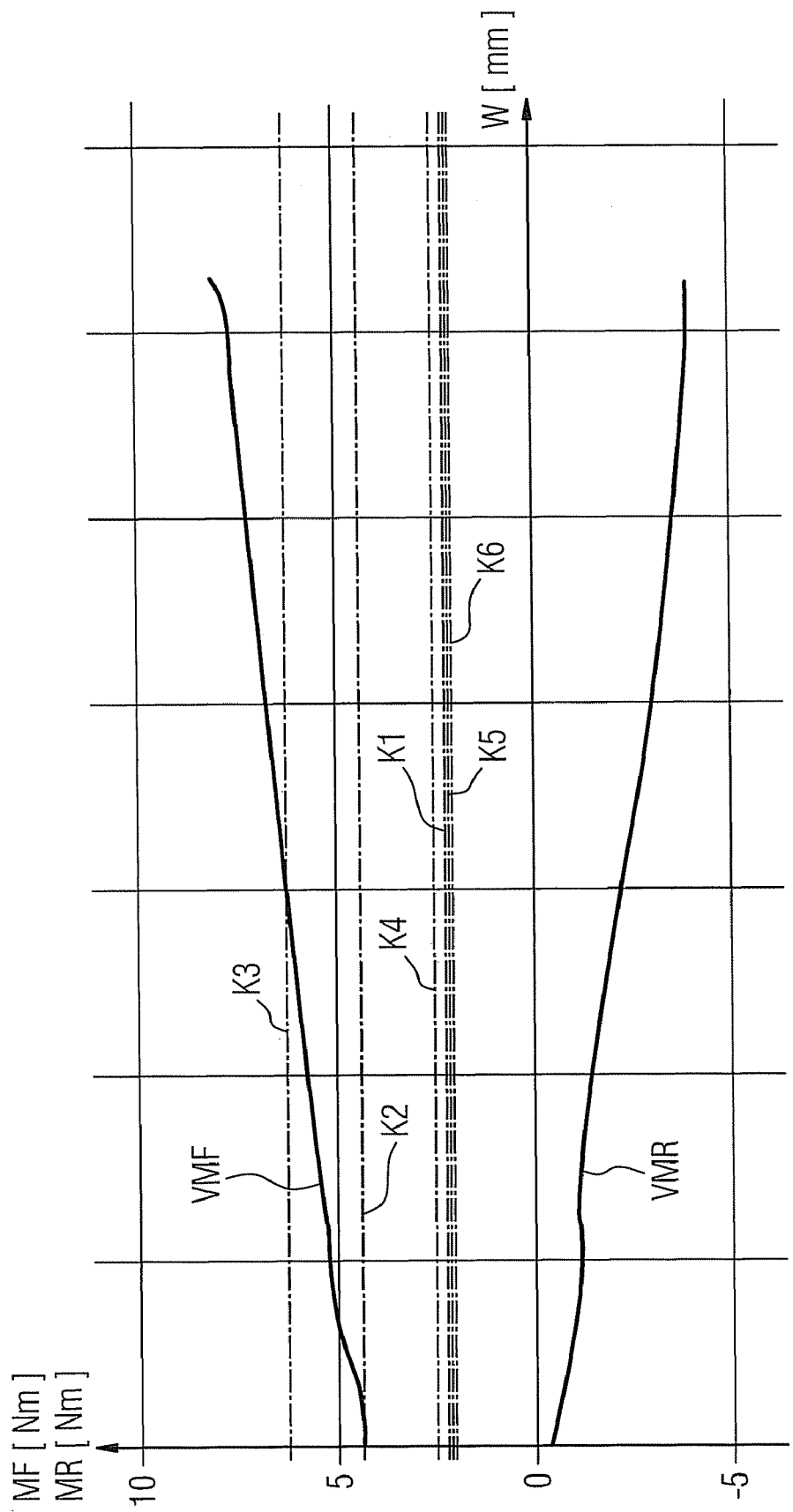

FIG. 4 shows an example of the torque curve in accordance with FIG. 3 with entries for new, direction-independent characteristic values.

The torque values MF, MR measured over the movement path W are now mapped into the new direction-independent characteristic values K1-K6. The three frictional moments K1, K5 and K6 in this case lie very close together. The differences only amount to very little. As a consequence the moment trend of the frictional force not entered in the example of FIG. 4 must then have very small values in terms of amount, whereas the moment trend of the elastic force must have comparatively high values. This is the direct result of the "reckoning out" of the significantly greater proportion by amount of the energy-conserving moment values from the measured torque values MF, MR. This now advantageously makes possible a far more accurate monitoring of the movement curve of an axis in respect of its friction-affected behavior. For monitoring advantageously only one direction-independent characteristic value K1-K6 in each case instead of two directional conventional characteristic values A1-A6 in each case is required. In a corresponding way an explicit monitoring of the movement curve of the axis in respect of its energy-conserving behavior is possible. This enables lack of sealing at pneumatic or hydraulic elements for elastic weight compensation to be detected. Friction-dependent proportions in this case are "reckoned out" and do not influence the characteristic values K2-K4.

Figure 5:
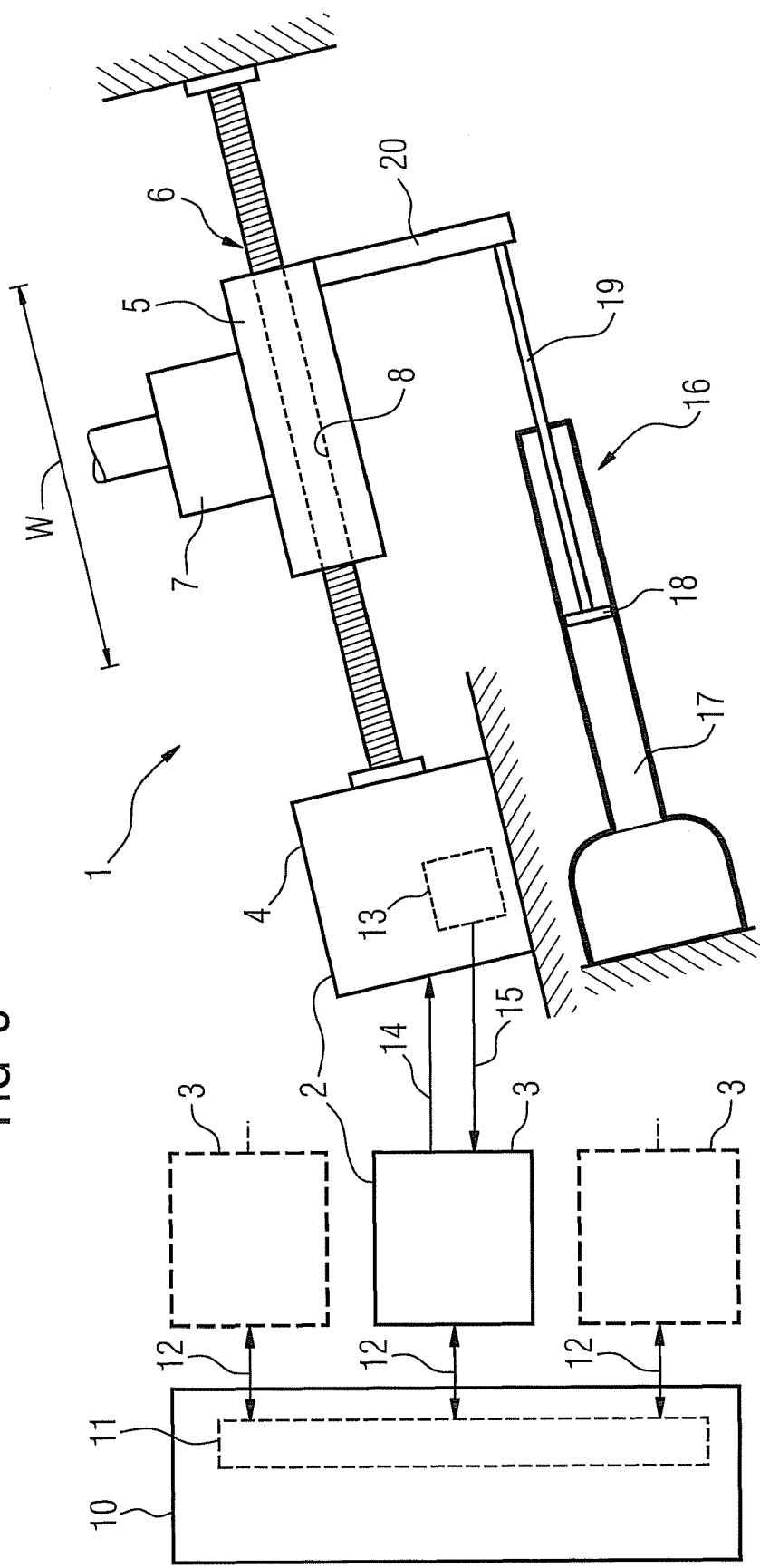

FIG. 5 shows a typical inventive machine tool 1 with a suspended axis 5 with elastic, pneumatic weight compensation 16.

In the right-hand part of FIG. 5 a suspended axis 5 of the machine tool 1 can be seen. W identifies the possible movement path of the axis 5. A rotating drive unit 2 with a converter 3, an electric motor 4 and a spindle drive 6 converts the rotational movement of the electric motor 4 into a linear travel movement of the axis 5. Reference symbol 7 identifies a typical tool which can be moved for processing a workpiece by the axis 5. Reference symbol 8 identifies an internal thread of the axis 5, in which the spindle is accommodated.

Also typically attached to the axis 5 is a holder 20 which uses a pusher 20 to activate a piston accommodated on a pusher end depending on the movement path W. The piston is displaceable in a cylindrical continuation of the compressed air container 17. The latter acts as an elastic element 16 to compensate for the weight force on the axis 5. The elastic force acting from the pressure container 17 via the holder 20 on the axis 5 is typically not linear with the movement path W, but rather of a parabolic nature.

Visible in the left-hand part of FIG. 5 is an inventive control device 10 which is connected for control and monitoring for signaling or data processing to the machine 1. It is typically a component of the machine tool 1. The control device 10 has an inventive measurement and evaluation unit 11, which, in the example of the present FIG. 5 is already integrated into the control unit 11 of the control device 10. The reference symbol 3 identifies converters for supplying an electric motor 4 for moving the respective axis 3 in each case, with, in the example of FIG. 3 only one axis 3 being shown in the drawing for the sake of simplicity. The center converter 3 is linked one the one hand for data processing via corresponding control lines 12 to the control device 10 and on the other via motor lines 14 to the electric motor 4 for electrical feeding. The reference symbol 13 identifies a torque sensor for detection of the torque acting on the electric motor 4. The corresponding torque values are detected for data processing and/or signaling via a sensor line 15 by the converter 3 for controlling the electric motor 4. The torque values are forwarded for inventive determination of the new direction-independent characteristic values inter alia via the converter 3 to the control device 10 or to the measurement and evaluation unit 11. The computing means of the measuring and evaluation unit 11 in this case execute the computing rules shown in FIG. 2.

Preferably the converter 3 of the drive unit 2 has a current sensor not shown in further detail for detecting a motor current. The control device 10 in this case has means for calculating the torque MF, MR currently acting on the electric motor 4 from a current value detected by means of the current sensor.

Instead of the rotational drive unit shown in FIG. 5 the machine 1 can also feature one or more linear drive units each with a converter 3 and a linear motor for moving the respective axis 5. In this case the means of the measurement and evaluation unit 11 of the control device 10 are embodied to determine the new direction-independent translational characteristic values K1-K8 based on measured force values or axis force values. Preferably the converter 3 of the respective drive unit then has a current sensor for detecting a linear motor current. Furthermore the control device 10 has means for computing the force currently acting on the linear motor from a current value detected by means of the current sensor.

The invention claimed is:

1. A method for determining at least one characteristic value of an axis, comprising:
   providing a suspended driven axis of a machine, the axis being driven by a rotating drive unit or by a linear drive unit;
   providing a measurement and evaluation unit comprising a first device and a second device;
   connecting the measurement and evaluation unit to a torque sensor or to a force sensor;
   measuring a torque acting on the rotating or linear drive unit, or a force corresponding to said torque, along a predetermined movement path of the axis, wherein the torque or the force is measured in a forward direction and in a reverse direction, the torque or force being measured by the first device of the measurement and evaluation unit; and
   determining energy-conserving moments or energy-conserving forces or friction-dependent moments or friction-dependent forces by the second device of the measurement and evaluation unit based upon a computational overlaying of associated torque or force values as a direction-independent characteristic value.

2. The method as claimed in claim 1, wherein
   an energy-conserving moment is the moment which compensates for a weight force acting via the axis on the rotating or linear drive unit, or
   an energy-conserving force is the force which compensates for the effect of the weight force.

3. The method as claimed in claim 1, wherein
   an energy-conserving moment is the torque which compensates for an elastic force acting via the axis on the rotating or linear drive unit, or that
   an energy-conserving force is the force which compensates for the corresponding effect of an elastic force.

4. The method as claimed in claim 1, wherein the torque or the force is measured at a predetermined constant speed of movement of the axis in the forward direction and the reverse direction.

5. The method as claimed in claim 1,
   wherein the respective associated speed of movement in the forward and reverse direction is measured for the torque, and
   wherein the energy-conserving moments and/or the friction-dependent moments are determined by computational overlaying of the torque values taking into account in the computation associated acceleration-dependent inertial forces and speed-dependent frictional forces or
   wherein the corresponding energy-conserving or friction-dependent forces are determined by overlaying corresponding force values.

6. The method as claimed in claim 1, wherein the torque or force values are measured depending on the movement path of the axis.

7. The method as claimed in claim 1,
   wherein the at least one computationally-determined characteristic value is compared with a respective comparison value, and
   wherein a warning message is output in the event of an impermissible deviation from the comparison value.

8. The method as claimed in claim 1,
   wherein a computationally determined, energy-conserving and direction-independent characteristic value is
   a moment offset, a maximum conserving moment, a minimum conserving moment or a moment trend of the elastic force, or is
   a force offset, a maximum conserving force, a minimum conserving force or a force trend of the elastic force.

9. The method as claimed in claim 1,
   wherein a computationally determined friction-dependent and direction-independent characteristic value is
   a mean frictional moment, a maximum frictional moment, a minimum frictional moment or a moment trend of the frictional force or is
   a mean frictional force, a maximum frictional force a minimum frictional force or a force trend of the frictional force.

10. The method as claimed in claim 1, wherein the at least one characteristic value is determined for a plurality of driven axes of the machine.

11. The method as claimed in claim 1, further comprising:
    monitoring the at least one characteristic value of the axis during commissioning or during a setting or during an operation of the machine in an automation or manufacturing environment.

12. A measurement and evaluation unit for determining at least one characteristic value of at least one suspended driven axis of a machine, the axis of the machine being driven by means of a rotating drive unit or by means of a linear drive unit, comprising:
- a data connection between
  - the measurement and evaluation unit and a torque sensor or between
  - the measurement and evaluation unit and a force sensor for torque or force measurement of the respective axis; and
- a linear encoder for movement detection of the movement path of the respective axis,
- wherein the measurement and evaluation unit has
  - a first device for a measurement detection of the torque or of the force of the respective axis in a forward and a reverse direction, and
  - a second device for a computational determination of energy-conserving moments or forces and/or friction-dependent moments or forces as the at least one direction-independent characteristic value by computational overlaying of associated torque or force values.

13. The measurement and evaluation unit as claimed in claim 12, wherein the measurement and evaluation unit detects the torque or force values as a function of the movement path of the respective axis.

14. The measurement and evaluation unit as claimed in claim 13,
- wherein the measurement and evaluation unit computes the movement speed of the respective axis in the forward and reverse direction, and
- wherein the measurement and evaluation unit determines the energy-conserving moments and/or the friction-dependent moments by computational overlaying of associated torque values taking into account in the computation associated acceleration-dependent inertial forces and speed-dependent frictional forces.

15. The measurement and evaluation unit as claimed in claim 13, wherein the measurement and evaluation unit determines corresponding energy-conserving and/or friction-dependent forces by overlaying corresponding force values.

16. The measurement and evaluation unit as claimed in claim 12,
- wherein the measurement and evaluation unit has an output for the computationally-determined characteristic value, and
- wherein the measurement and evaluation unit compares the determined characteristic value with a respective comparison value and outputs a respective warning message in the event of an impermissible deviation from the comparison value.

17. The measurement and evaluation unit as claimed in claim 12, wherein the computationally determinable, energy-conserving and direction-independent characteristic value is
- a moment offset, a maximum conserving moment, a minimum conserving moment or a moment trend of the elastic force, or is
- a force offset, a maximum conserving force a minimum conserving force or a force trend of the elastic force.

18. The measurement and evaluation unit as claimed in claim 12, wherein the determinable friction-dependent and direction-independent characteristic value is
- a mean frictional moment, a maximum frictional moment, a minimum frictional moment or a moment trend of the frictional force or is
- a mean frictional force, a maximum frictional force, a minimum frictional force or a force trend of the frictional force.

19. A machine tool, comprising:
- a drive unit with a converter and an electric motor, wherein the converter has a current sensor for detecting a motor current;
- a control device to control and monitor the machine tool,
  - wherein the drive unit is controlled via the control device,
  - wherein the control device computes the current torque acting on the electric motor from a current value detected by the current sensor,
  - wherein energy-conserving moments or forces and/or friction-dependent moments or forces are determined as a direction-independent characteristic value based upon an overlaying of associated torque or force values;
- a torque sensor or a force sensor for torque or force measurement of the respective axis,
- wherein the torque or the force of the respective axis are measured in a forward and reverse direction; and
- an encoder to detect a movement of the movement path of the respective axis.

* * * * *